July 31, 1934.  R. V. PROCTOR ET AL  1,968,422
MULTIPLE CONTROL VALVE
Filed Dec. 30, 1931  6 Sheets-Sheet 4
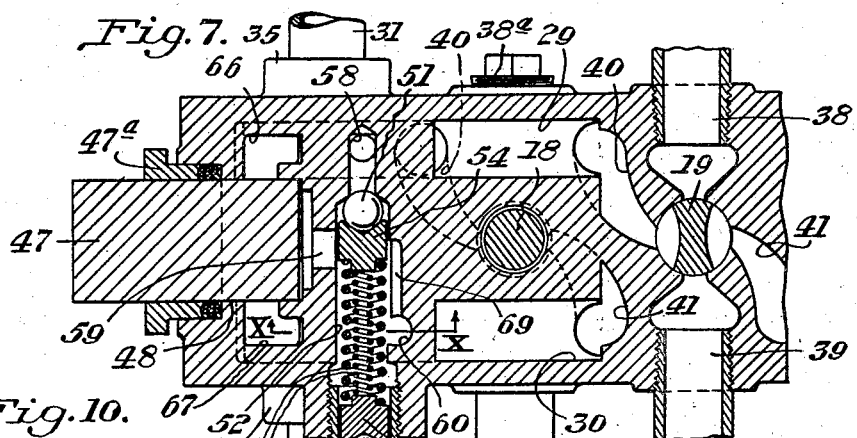
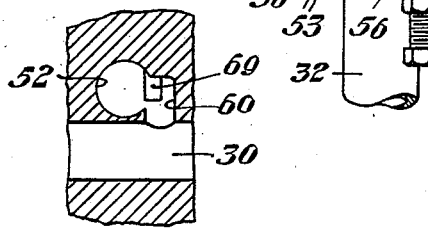
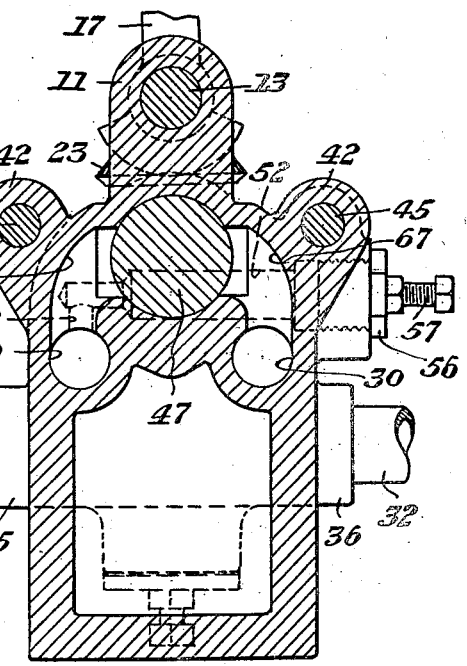
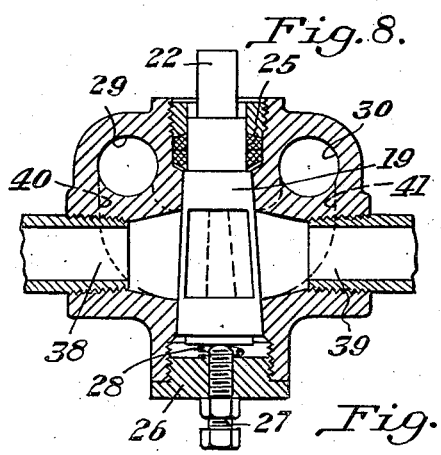
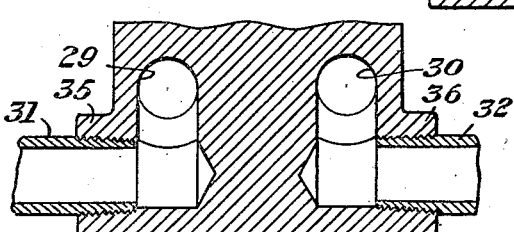
INVENTORS
Robert V. Proctor &
William T. Stephens
by their attorneys
Byrnes, Stebbins, Parmelee & Blenko

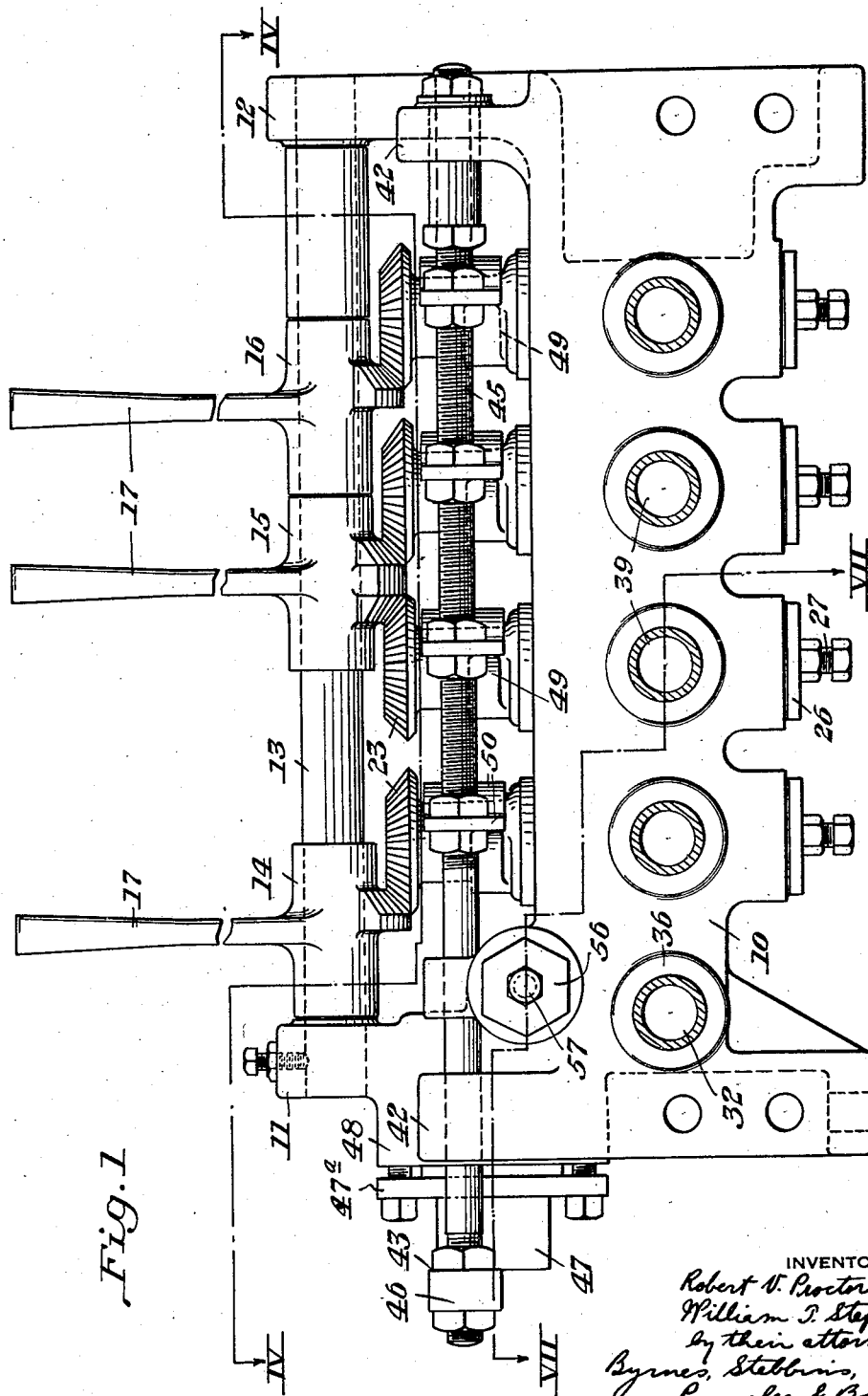

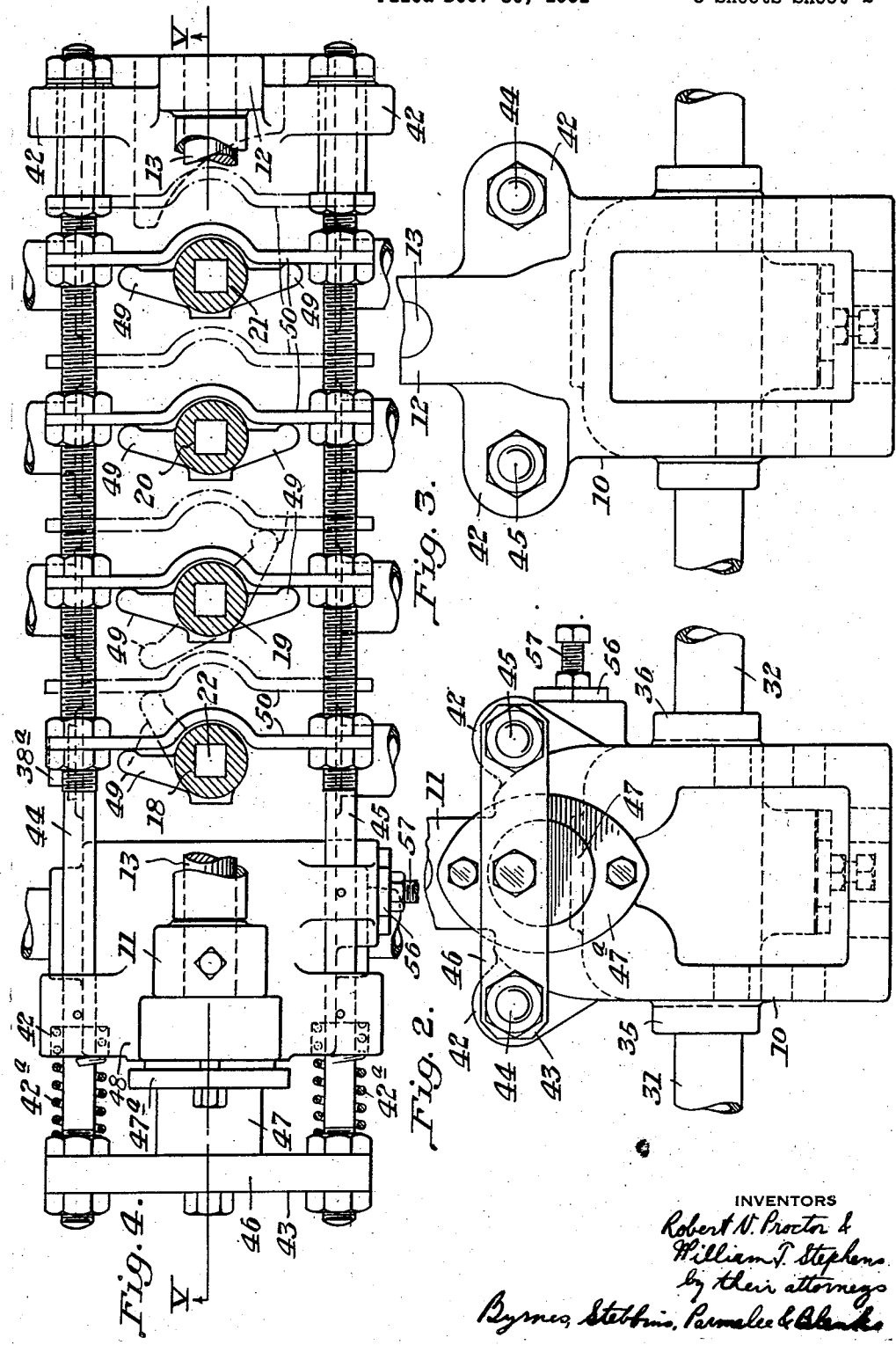

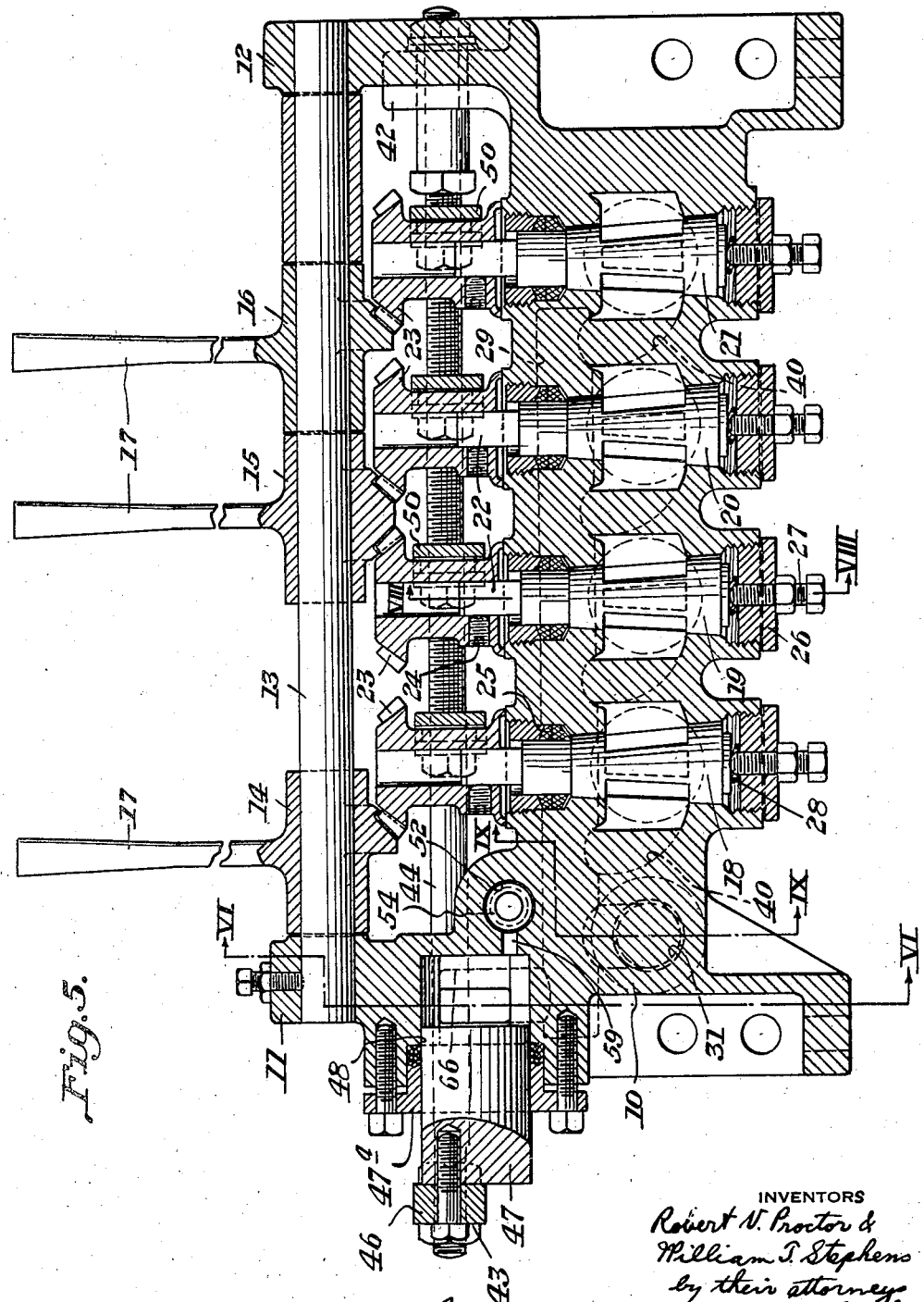

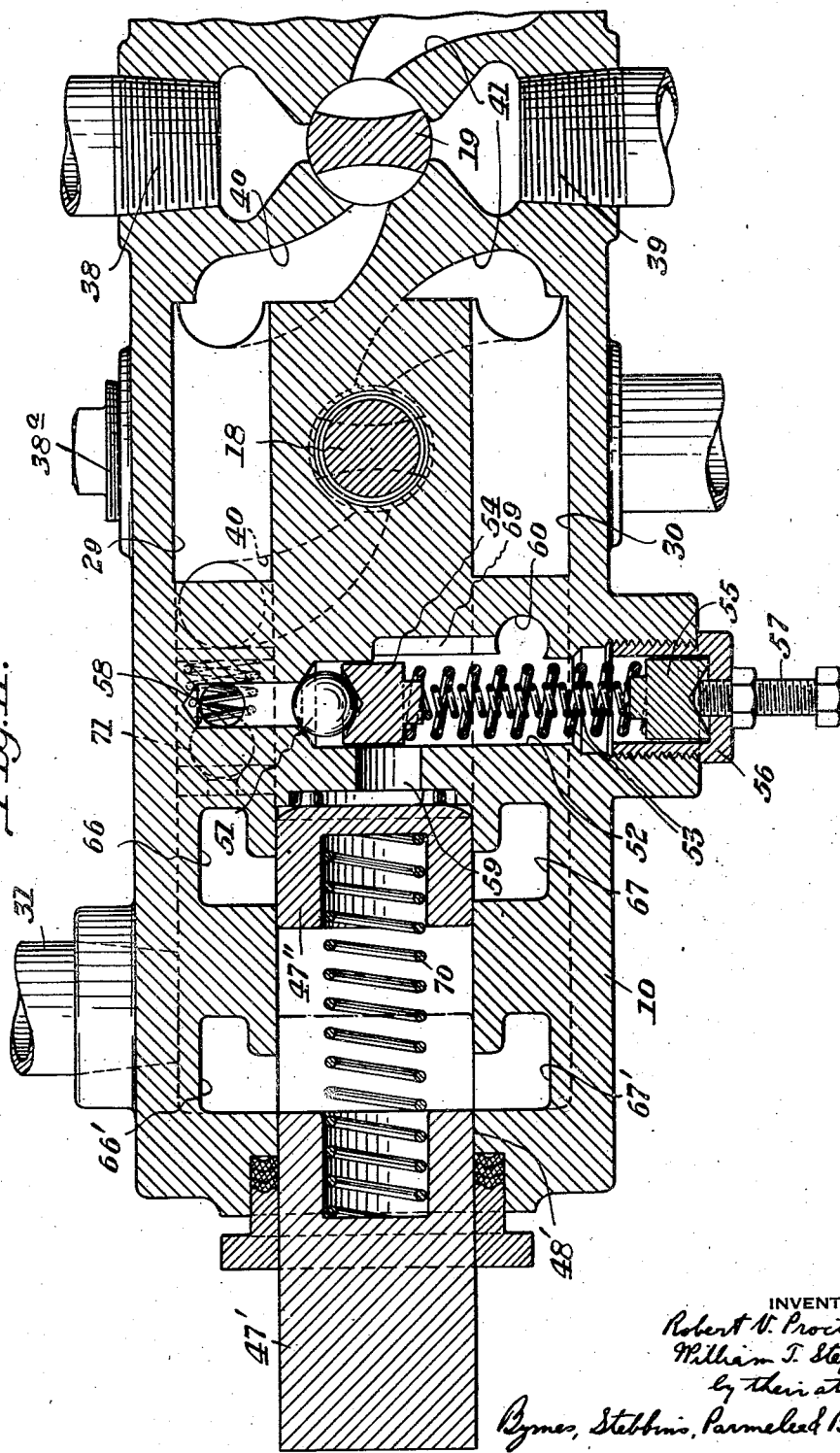

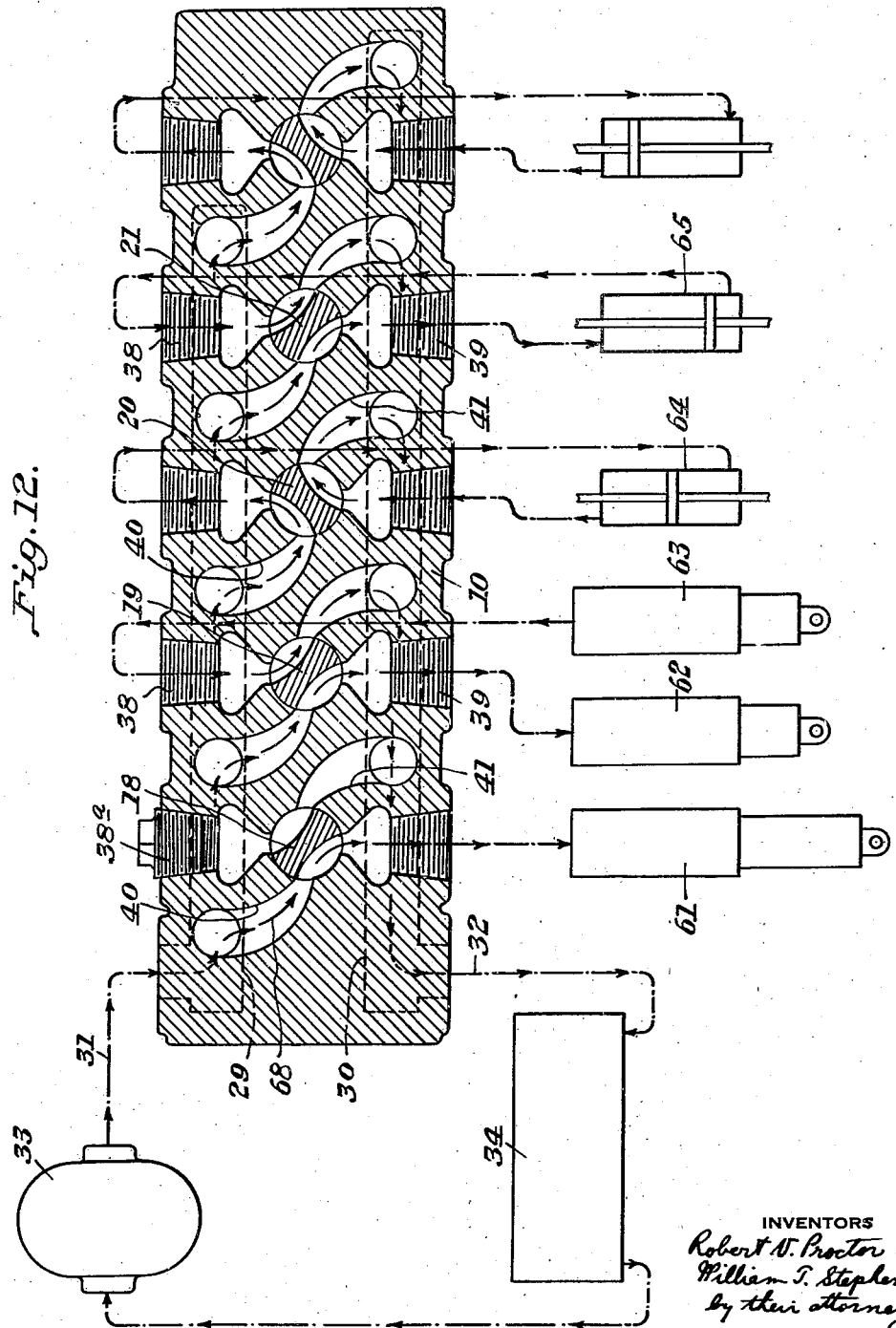

Patented July 31, 1934

1,968,422

UNITED STATES PATENT OFFICE 1,968,422

MULTIPLE CONTROL VALVE

Robert V. Proctor and William T. Stephens, Youngstown, Ohio, assignors to The Commercial Shearing & Stamping Company, Youngstown, Ohio, a corporation of Ohio Application December 30, 1931, Serial No. 583,862

13 Claims. (Cl. 137—144)

Our invention relates to the control of fluid in hydraulic systems and, in particular, to a multiple valve for controlling a plurality of hydraulic power devices.

In view of the comparatively general use of power devices operating on the hydraulic principle, it has become desirable to have available a valve of simple and compact construction which can be employed to control independently a plurality of fluid circuits. In one type of snow plow, for example, there are as many as five hydraulic jacks for various purposes such as adjusting the height of the plow and the like. Another example is one type of concrete mixer in which there are as many as nine hydraulic jacks for performing various functions thereabout. Coal loaders, road scrapers, and other devices also require a plurality of hydraulic jacks. Heretofore, it has been necessary to provide separate control valves and supply and exhaust lines for each separate jack. All the multiple valves with which we are familiar require a great deal of pipe, numerous levers, handles, and the like, which make them too clumsy and awkward for practical service.

The valve of our invention eliminates all separate supply and exhaust lines and requires only one connection from the valve to both the source of pressure and the storage tank and, at the same time, is effective for independently controlling a large number of separate hydraulic power devices such as jacks. The invention, furthermore, is highly flexible in that it can be adapted to the control of almost any desired number of units. A particular advantage of our invention is that any combination of one or more units can be controlled by one operating lever. Another important feature of the invention is that when any one of the power devices controlled thereby has reached the limit of its movement, the application of pressure thereto is automatically cut off.

In accordance with our invention, we provide a valve casing adapted to receive a plurality of valve plugs. Main supply and exhaust passages traverse the valve casing and communicate with each individual valve. The operating levers for the various valves may be arranged to control one or more valves and automatic means responsive to increased pressure returns the valves to neutral position after the devices controlled thereby have been fully actuated. Normally, when none of the valves have been operated, a free circuit for operating fluid is provided.

A modification of the invention provides means for cutting off the pressure supply automatically upon the completion of the movement of any of the power devices such as hydraulic jacks without restoring the operating levers to neutral position. This eliminates the danger of injury to the operator from a sudden and unexpected return of the levers from operated to neutral positions.

For a complete understanding of the invention, reference is made to the drawings illustrating a present preferred embodiment thereof.

In the drawings,

Figure 1 is a side elevation of the valve of our invention, conduits leading thereto being shown in section;

Figure 2 is an end view of the device looking from the left onto the structure of Figure 1;

Figure 3 is an end view looking from the other end;

Figure 4 is a partial sectional view along the line IV—IV of Figure 1;

Figure 5 is a sectional view along the line V—V of Figure 4;

Figure 6 is a sectional view along the line VI—VI of Figure 5;

Figure 7 is a sectional view along the line VII—VII of Figure 1;

Figure 8 is a sectional view along the line VIII—VIII of Figure 5;

Figure 9 is a sectional view along the line IX—IX of Figure 5;

Figure 10 is a sectional view along the line X—X of Figure 7;

Figure 11 is a sectional view similar to Figure 7, showing a modified form of construction; and Figure 12 is a diagrammatic view showing the operation of our valve to control a plurality of hydraulic power devices.

Referring in detail to the drawings, a unitary casting 10 serves as a casing for a plurality of valves. The ends of the casting are flanged and provided with bolt holes for securing it to suitable supports. Bearing posts 11 and 12 extend upwardly from the ends of the casting to support a shaft 13 thereabove. A plurality of sleeves 14, 15, and 16 having operating handles 17 are journaled on the shaft 13 for actuating the individual valves.

The valves are of the plug type and are best shown in Figure 5 where they are illustrated at 18, 19, 20, and 21. The valve spindles are rotatable in tapered bores extending vertically of the casting 10, and have squared ends 22 on which bevel gears 23 are secured by set screws 24. The sleeves 14, 15, and 16 have one or more sets of bevel gears for cooperating with the gears 23, so that a valve plug may be turned in either direction by moving the handles 17 back and forth on their shaft 13. Packing glands for the upper ends of the valve plugs are indicated at 25. The lower ends of the valve bores are closed by screw caps 26. An adjusting screw 27 traverses the cap 26 for maintaining the plug in position and a spring 28 controls the friction between the plugs and their bores.

Extending longitudinally of the casting 10 and positioned above the valve plug bores are pressure and exhaust ducts 29 and 30. Conduits 31 and 32 communicate respectively with a source of pressure such as a pump 33 in Figure 12 and a storage tank or reservoir 34. The conduits 31 and 32 are threaded into bosses 35 and 36 in the casting 10. Short vertical passages connect the passages 29 and 30 to the conduits 31 and 32.

Each of the valves 18, 19, 20, and 21 is provided with ports 38 and 39 which may be inlet or outlet ports according to the position of the valve plug, as will be explained more fully later. Short curving passages 40 and 41 connect the ducts 29 and 30 to the ports 38 and 39. By shifting the valve plug to the desired position, it is possible to direct fluid from the duct 29 into either of the ports 38, 39 or from either of said parts into the exhaust duct 30.

Ears 42, formed integral with the ends of the casting 10, provide bearings for a sliding yoke 43. The yoke 43 includes side rods 44 and 45, which are threaded for a considerable portion of their length as illustrated in Figure 4. A cross-head 46 connects the yoke 43 to a piston 47. The piston 47 reciprocates in a cylindrical recess 48 formed in one end of the casting 10. A packing gland 47a provides a fluid-tight joint between the cylinder and piston.

The valve plugs 18, 19, 20, and 21 are provided adjacent their upper ends with tappets 49 extending on one or both sides of the valve plug. Cross straps 50 extend between the side rods 44 and 45 of the yoke 43 adjacent each of the valve plugs so that on rotation of one of the plugs, its tappet 49 engages the strap 50 to shift the yoke to the right. Conversely, movement of the yoke to the left will restore all the valves to the neutral position illustrated in solid lines in Figure 4. The positions of the cross straps 50 on the side rods 44 and 45, of course, may be adjusted by means of their securing nuts.

The operation of the piston 47 in its cylinder is controlled by a relief valve 51 mounted in a bore 52 extending transversely of the casting 10. The ball valve 51 is normally closed by means of compression springs 53 engaging plugs 54 and 55. The plug 55 is adjustable in its seat in a screw cap 56 by means of an adjusting screw 57.

A passage 58 extending upwardly from the ducts 29 intersects the reduced end of the bore 52 on the side of the ball valve 51 opposite the springs 53. A port 59 connects the bore 52 to the cylinder in which the piston 47 reciprocates. A passage 60 extends downwardly from the bore 52 into communication with the exhaust passage 30.

In order to describe the operation of our valve, we shall refer to the schematic diagram of Figure 12. In Figure 12, a multiple valve is shown corresponding generally to the actual structure shown in the other figures of the drawings, except that in Figure 12 a five-valve unit is shown. Since the third and fifth units of this valve, counting from the left, control similar types of devices in identically the same manner, we may for convenience identify the first four valves shown in Figure 12 by numerals corresponding to those used above and neglect the fifth valve in Figure 12. Other parts of the device appearing in Figure 12 will also be illustrated by the same numerals used in the other figures. It will be understood, of course, that Figure 12 is included merely to show the path of fluid through the various valves and in different positions, but Figures 1 through 10 are relied on to disclose the actual structure we prefer to employ.

As illustrated by Figure 12, the valve 18 controls a single-acting hydraulic jack 61. The valve 19 simultaneously controls two single-acting jacks 62 and 63. The jacks 62 and 63 are adapted to be controlled so that when one is extended the other is contracted and vice versa. The valves 20 and 21 control double-acting cylinders 64 and 65. The fifth valve shown in Figure 12 is similar to that shown at 20 and needs no further description. The neutral position of the valves is indicated in solid lines in Figures 7 and 8. In this position, the ports 38 and 39 of both valves are closed, as well as the junction of the passages 40 and 41 with the valve bore.

In describing the operation of the invention, we shall assume that all the valves are in their neutral positions and that the yoke 43 occupies its left-hand extremity of movement so that the piston 47 is partially withdrawn from its cylinder. Under these conditions, a free path for circulating fluid through the valve is established between the inlet, high-pressure conduit 31 and the outlet, low-pressure, exhaust conduit 32. This path includes passages 66 and 67 extending upwardly from the ducts 29 and 30 into communication with the cylindrical recess 48. When the piston 47 is partially withdrawn from the recess 48, the passages 66 and 67 are placed in communication, since they both open into the recess. The pump 33, therefore, drives fluid into the duct 29 through the conduit 31 and thence through the passages 66 and 67 to the duct 30, whence the fluid flows by the conduit 32 to the storage tank or reservoir 34.

When one of the valves, for example, the valve 18, is shifted from the neutral position shown in Figure 7 to the solid line position of Figure 12, the tappet 49, associated with said valve, is shifted as shown in dotted lines in Figure 4, so that when the valve is turned to extend a jack or operate a piston, the yoke 43 is shifted to the right. This movement of the yoke operates the piston 47 secured thereto, so that it lies almost wholly within the recess 48. When the piston is thus retracted, the free path for oil circulating through the valve including the passages 66 and 67 is closed, since the last-mentioned passages communicate only through the cylindrical recess 48.

The movement of the valve which causes the free path of the circulating fluid to be cut off, however, opens an alternative path which includes the passage 40 adjacent the valve 18 and the port 39 thereof. With the valve 18 in the position illustrated in Figure 12, fluid flows from the pump 33 through the valve to the jack 61, as indicated by the arrows 68. The jack 61 is extended by the fluid under pressure conducted thereto, to operate the mechanism with which it is connected. When the jack reaches the limit of its movement, the continued supply of fluid thereto develops an increased pressure in the fluid circuit including the duct 29.

The relief valve 51 is subject to the pressure in the duct 29 because of the connecting passage 58 joining the duct with the bore 52. When the pressure increases to a certain value, determined by the adjustment of the springs 53, the relief valve 51 is opened and fluid under pressure is supplied to the bore 52. The movement of the relief valve 51 retracts the plug 54. The retraction of the plug 54 first closes the lower side of the port 48, as shown in Figure 7. Further movement of the plug opens the upper side of the port to supply fluid under pressure to the cylindrical recess 48. The piston 47 is thereby shifted to the left and carries with it the yoke 43. The movement of the yoke, by engagement of the straps 50 with the tappets 49, restores all the valves to neutral position, as shown in Figures 4 and 5. The movement of the piston also restores the free path for circulating fluid.

The pressure on the fluid within the valve casing is thereby reduced and the ball relief valve 51 is reseated and the plug 54 advances therewith. The lower side of the port 59 is thus opened to release the oil within the recess 48, so that the piston 47 may again be retracted on the next valve operation.

In case the piston 47 is not actuated by the fluid pressure as above described, further increase in the pressure of the fluid within the casing will cause further retraction of the plug 54, so that a recess 69 in the bore 52 is uncovered. This recess communicates with the passage 60 leading to the discharge duct 30. This mechanism insures that if the valve resetting mechanism fails to operate for any reason, the pressure within the casting will be relieved before it reaches a dangerously high value.

Since the jack 61 is single acting, the port 38 of the valve 18 is closed by a plug 38a. When it is desired to retract the jack 61, the valve 18 is shifted to a position similar to that of the valve 20 as shown in Figure 12. This connects the cylinder of the jack 61 to the discharge duct 30 by the passage 41 adjacent the valve 18. The load on the jack then causes it to telescope and the fluid in the cylinder is discharged into the tank 34. The tappet associated with the valve spindle 18 extends to one side only thereof for the reason that, since this valve controls one single-acting piston only, and the port 38 thereof is permanently closed, if the double-arm tappet were used on the valve 18, when the valve was shifted to jack-lowering position, it would immediately be reset because of the building-up of pressure in the duct 29.

We provide springs 42a for resetting the yoke when one of the operating handles is restored to neutral before the completion of the movement of the device controlled thereby. In the case of the valve spindle 18 controlling the single-acting cylinder 61, if the operator desires to stop the jack before it reaches its outward limit of movement, he can manually restore the operating lever to neutral. If this is done slowly, the automatic resetting mechanism may operate and give the lever a sudden blow to the discomfort of the operator. The springs 42a are strong enough to reset the yoke when all the tappets have been positioned transversely thereof but are not strong enough to reset the yoke when the latter is urged to the right by one of the tappets. Thus, if the operator returns the lever controlling the spindle 18 to neutral slowly, the yoke follows the movement of the lever and bypassing fluid through the passages 66 and 67 without operating the relief valve 51 and applying pressure to the piston 47.

The valve 19, as shown in Figure 12, is connected to control the two jacks 62 and 63, so that one jack is extended while the other is retracted. The port 38 is connected to the jack 63 and the port 39 to the jack 62. With the valve 19 in the position shown in Figure 12, the jack 62 is connected to the high pressure duct 29 through the passage 40 and is, therefore, in process of being extended. The jack 63 is connected to the low pressure or discharge duct 30 through the port 38 and the passage 41, so that this jack is being retracted. In the other position of the valve 19, that is, the position of valve 20, the jack 63 would be connected to the high-pressure duct and the jack 62 to the discharge duct.

The valve 20 controls a double-acting cylinder 64 in a manner similar to that above described for the control of the two jacks 62 and 63, and it is believed that this method of operation will be apparent without further explanation. The valve 21 similarly controls a double-acting cylinder 65. The path of the fluid through the various valves, ports and passages is clearly indicated by the arrows.

While the valve resetting mechanism above described is found to operate satisfactorily, the operating levers are sometimes reset quickly with the possibility that the operator may be injured if his hand is in the way of the lever being reset. In order to overcome this objection, and to permit the release of the pressure without resetting the valves, I provide an alternative construction shown in Figure 11. While this construction does not automatically return the valve operating levers to neutral position, it requires that the operating levers be restored to neutral by hand before further operations can be effected. In Figure 11, the elements having the same construction already described are illustrated by corresponding reference numerals. Elements having a slightly modified construction are indicated by the same reference numerals with a prime affixed thereto.

In general, the construction of Figure 11 is similar to that shown in Figure 7, except that a larger cylindrical recess 48' is formed in the end of the casting. Instead of a single piston 47, two pistons 47' and 47'' are reciprocable in the recess 48. A spring 70 tends to separate the pistons. The piston 47' is connected to the yoke 43 as in the previous description. In parallel with the passages 66 and 67, a second set of similar passages 66' and 67' provide an alternative free path for fluid. A check valve 71 is incorporated between the passage 66 and the duct 29. The construction is otherwise exactly similar to that of the other figures and a description of the operation of the modified construction will now be given.

Under normal conditions, all the valves are in neutral position and the other parts are in the positions illustrated in Figure 11. A free path for circulating fluid is then established through the passages 66' and 67' and the cylindrical recess 48' therebetween. When one of the valves is operated, however, the piston 47' is shifted to the dotted line position shown in Figure 11 and thereby closes the aforementioned free path. Fluid then passes through the check valve 71 and through the valve passages to operate the device under control. When the latter has reached the limit of its movement, the valve 51 is operated as already described to admit fluid to the inner end of the recess 48'. The piston 47'' is thereupon actuated by the fluid, shifts toward the left, and compresses the spring 70. This movement of the piston 47″ is sufficient to establish communication between the passages 66 and 67 to permit continued flow of fluid through the device. On the opening of this bypassing connection, the valve 51 recloses, but the piston 47″ is maintained in its actuated position by the pressure of the fluid which, of course, is dependent upon the strength of the spring 70. The check valve 71 traps the fluid which has been supplied to the passages of the valve casting and the cylinder of the device being operated so that it is maintained in position.

Before any further valve operations can be effected, it is necessary to cut off communication between the passages 66 and 67. This may be done by retracting the piston 47′. This movement of the piston is caused by the spring 70 on manually restoring the lever handle to neutral position. The yoke 43 is thereby shifted to the left to withdraw the piston to the position shown in Figure 11. The passages 66′ and 67′ are thereby again connected and the piston 47″ reseats itself against the inner end of the recess 48′. Any further valve operation again retracts the piston 47′ and the foregoing cycle is repeated. It will be apparent that the modification of Figure 11 performs substantially the same function as that form of the invention described in the other figures, except that the former does not require any movement of the valve in order to release the working pressure. The valves are then manually reset and all possibility of danger of injury to the operator is avoided.

It will be apparent that the invention is characterized by numerous advantages. In the first place, it is simple and compact in construction and necessitates only a minimum of pipe connections. At the same time, the valve may be constructed to control a large number of devices, and this is particularly important because many pieces of apparatus now in common use include a number of hydraulic power mechanisms. Practically any combination of hydraulic power devices may be operated by a single lever.

The valve is very flexible and can readily be designed to meet the particular requirements of almost any given installation. The number of the valves and the sequence of operations can be widely varied. The automatic means for diverting the supply of fluid under pressure when the hydraulic devices have operated is also important, because it does not require the operator to pay any attention to the operation after the valve has been initially opened. The remainder of the operation is automatic and the power device is maintained in operated position until released.

Although we have illustrated and described herein but a single present preferred embodiment of the invention with a modification of a portion thereof, it will be apparent that the invention may be otherwise embodied without departing from the spirit thereof or the scope of the appended claims.

We claim:

1. A multiple control valve for a hydraulic system comprising a valve casing, a plurality of valve plugs therein, a shaft supported on said casing, a plurality of operating levers for said valves journaled on said shaft, and common resetting means for said valves.

2. In a multiple valve, a casing, a plurality of valves spaced therealong, a shaft adjacent one end of the valves, sleeves on said shaft, handles for rotating the sleeves, and means on said sleeves and valves for turning the valves on rotation of said sleeves.

3. In a valve, a casing, a valve member therein, means for rotating said member, resetting means for the member actuated away from resetting position by rotation of the member, and means responsive to a predetermined pressure in the valve for operating said resetting means to shift said member toward resetting position.

4. In a valve, a casing, a valve spindle journaled therein, means for turning the spindle, a yoke reciprocable in said casing, means on said spindle for shifting the yoke on rotation of the spindle, and means for actuating the yoke to reset the valve.

5. In a multiple valve, a casing, a plurality of valve spindles journaled therein, a yoke slidable in the casing, tappets on the spindles for shifting the yoke on rotation of said spindles, and means for restoring said yoke to reset the spindles.

6. In a valve, a casing, a valve spindle rotatable therein and automatic pressure-responsive means for resetting the valve spindle comprising a cylinder, a piston therein, means connecting the piston and spindle, and a relief valve for admitting fluid to said cylinder.

7. In a valve, supply and discharge ducts, a bypass connecting said ducts and a piston valve for controlling said bypass, a valve spindle, means operated by movement thereof for shifting said piston valve to close the bypass, passages controlled by said spindle communicating with said ducts, and a relief valve for admitting fluid to said piston valve to open said bypass in response to a predetermined pressure in said supply duct.

8. In a multiple valve, a casing, a plurality of valve spindles journaled therein, fluid supply and discharge ducts in said casing, passages extending from said ducts to said spindles, a bypass for fluid, a piston valve for controlling said bypass, means operated by movement of said spindles to open position for closing said bypass, and means responsive to the pressure in said supply duct for opening the bypass.

9. In a multiple valve, a casing, a plurality of valve spindles journaled therein, a bypass for fluid supplied to the valve, a piston for closing the bypass, tappets on said spindles and a yoke engaged thereby for actuating said piston on movement of one of said spindles.

10. In a multiple valve, a casing, a plurality of valve spindles journaled therein, a bypass for fluid supplied to the valve, a piston for closing the bypass, tappets on said spindles and a yoke engaged thereby for actuating said piston on movement of said valve, a second bypass, and means responsive to the pressure of the fluid for opening the second bypass while the first bypass remains closed.

11. In a multiple valve, a casing, a plurality of valve spindles journaled therein, two bypasses for fluid supplied to the valve, piston valves for closing said bypasses, means actuated by rotation of one of the valve spindles for operating a piston valve to close one of said bypasses, and pressure responsive means for causing the other piston valve to open the remaining bypass.

12. In a multiple valve, a casing, a plurality of valve spindles journaled therein, two bypasses for fluid supplied to the valve, piston valves for closing said bypasses, means for normally maintaining one of said piston valves open and one closed, means actuated by movement of one of the spindles for closing the normally open piston valve, and pressure-responsive means for opening the normally closed piston valve.

13. In a multiple valve, a casing, a supply duct and a plurality of valve spindles therein for distributing fluid under pressure, a bypass for the fluid, means actuated by operation of one of the spindles for closing the bypass, and means responsive to the pressure in said duct for re-establishing a bypass.

ROBERT V. PROCTOR.
WILLIAM T. STEPHENS.